United States Patent
Specht

[11] 3,771,232
[45] Nov. 13, 1973

[54] TRAILER LEVELING SYSTEM
[76] Inventor: Walter A. Specht, 124 Stanford Ln., Seal Beach, Calif. 90740
[22] Filed: June 23, 1971
[21] Appl. No.: 155,753

[52] U.S. Cl................. 33/375, 33/168 R, 33/174 H
[51] Int. Cl.............................................. G01c 9/00
[58] Field of Search...................... 33/88, 385, 374, 33/375, 174 S, 174 H, 168 R

[56] References Cited
UNITED STATES PATENTS

| | | | |
|---|---|---|---|
| 931,973 | 8/1909 | Tolley et al. | 33/374 |
| 1,449,118 | 3/1923 | Hoke | 33/174 H |
| 2,536,401 | 1/1951 | Victor | 33/168 R |
| 2,846,772 | 8/1958 | Strausser | 33/374 |
| 3,201,873 | 8/1965 | Bell | 33/168 |
| 3,286,356 | 11/1966 | Johnson | 33/375 |

Primary Examiner—Louis R. Prince
Assistant Examiner—Dennis A. Dearing
Attorney—John Holtrichter, Jr.

[57] ABSTRACT

A system for leveling the transverse axis of a trailer by determining in advance the number of a set of standard size blocks to be positioned under the trailer's lowest wheel in order to raise that side of the trailer the required amount; the system including an elongated level sensing device supported at one of its ends by a normally horizontal transverse surface and at its other end by a graduated surface on a leveling gauge which in turn is also supported by the transverse surface, the position of the graduated surface of the level-sensing device when the device indicates that it is level determining the number of standard blocks to be used.

3 Claims, 3 Drawing Figures

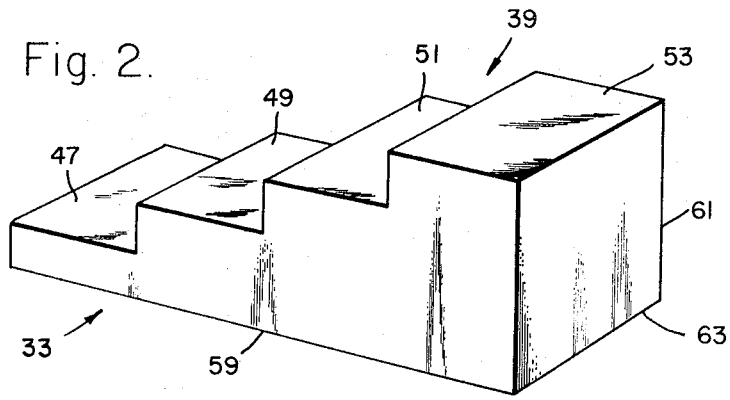
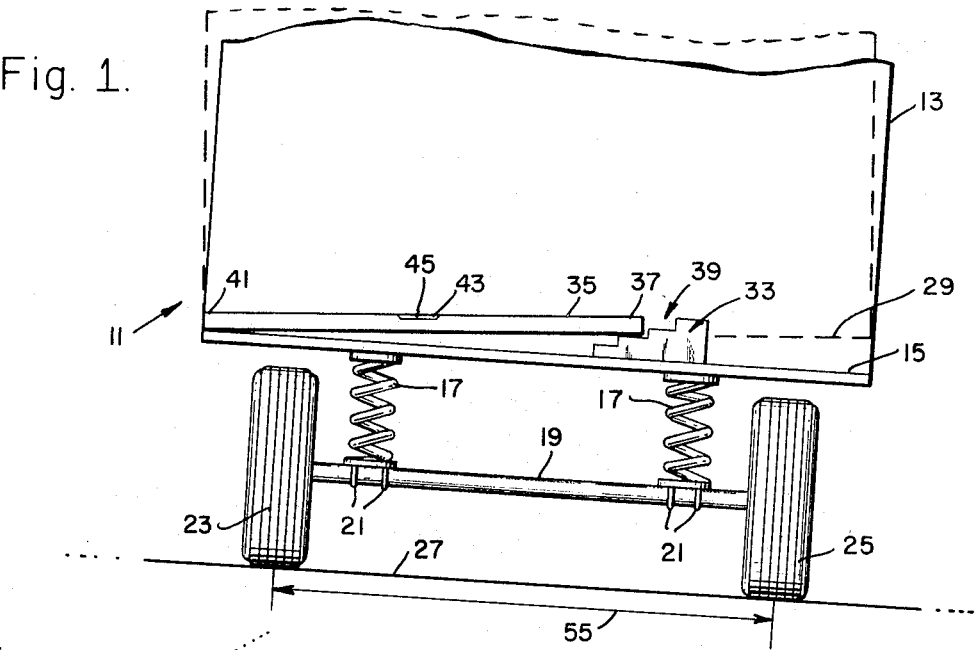
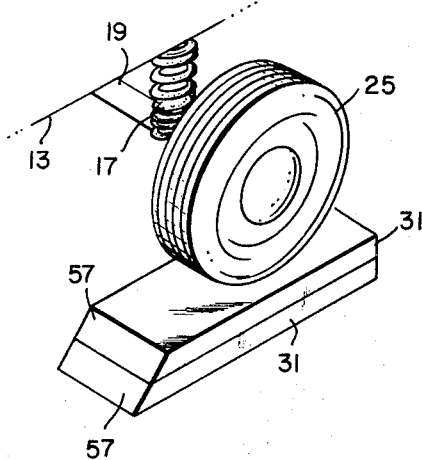

3,771,232

TRAILER LEVELING SYSTEM

BACKGROUND OF THE INVENTION

The background of the invention will be set forth in two parts.

1. Field of the Invention

The present invention pertains generally to the field of leveling systems, and more particularly to a system for leveling house and camping trailers and campers.

2. Description of the Prior Art

There has been a growing trend in this country and abroad for persons seeking rest and relaxation away from crowded and hurried life in the city to travel to remote vacation spots. In recent years the use of tents and the like has somewhat diminished and the popularity of house and camping trailers and campers has greatly increased because of their added comfort and utility.

Because the terrain on which the campsites are built is not always on a horizontal plane, the occupants of these portable abodes will frequently be inconvenienced by table tops, refrigerators, beds and floors not being level, and some means must be found to level the trailer. The cross-leveling of the trailer (one side lower than the other) presents the most difficult problem. Usually, some means is employed to raise the declining side of the trailer.

A widely used technique is simply to build up a dirt or gravel mound and to roll the trailer onto the mound in order to raise the trailer wheel an amount sufficient to raise it so that the trailer is level. The height of the mound is guessed at and this scheme usually requires several tries in order to finally attain the desired effect.

Many campers, not relying on the material at hand at the campsite, carry blocks of wood with them and roll the appropriate trailer wheel on one or more of these blocks to level the trailer. This technique, like the previously mentioned one, is a cut-and-try scheme, usually requiring several attempts before the correct number of blocks are employed.

Another leveling system used in the past incorporates jacks which are adjusted until the trailer is level. This approach to the problem is satisfactory in its results but is quite a bit more expensive than the previously mentioned ones.

From the foregoing, it should be evident that a new technique or system which would be simple in its construction and operation, and inexpensive, and which would eliminate the bothersome time and energy consuming cut-and-try method, would be a significant advancement in the art.

SUMMARY OF THE INVENTION

In view of the foregoing factors and conditions of the prior art, it is a primary object of the present invention to provide a new and improved leveling system for trailers and campers and the like, not subject to the disadvantages enumerated above.

It is another object of the present invention to provide a leveling system which indicates in advance the number of standard blocks which will be necessary to level a trailer.

It is still another object of the present invention to provide an inexpensive yet effective and accurate technique for leveling a trailer or camper situated on uneven and sloping terrain.

According to the present invention, a leveling system is provided for leveling house and camping trailers and the like having a transverse surface orthogonal to the longitudinal dimension of the trailer, the system including a leveling gauge positionable on the transverse surface and having a graduated surface. A level sensing device is supported at a first of its ends by the graduated surface and at its second end by the transverse surface of the trailer. Also included is a plurality of standard blocks having identical height dimensions and adapted to support the lower one of the trailer's wheels, the number of these blocks being determined by the position of the first end of the level sensing device on the graduated surface when the device indicates that it is level.

The features of the present invention which are believed to be novel are set forth with particularlity in the appended claims. The present invention, both as to its organization and manner of operation, together with further objects and advantages thereof, may best be understood by making reference to the following description taken in conjunction with the accompanying drawing in which like reference characters refer to like components in the several views.

BRIEF DESCRIPTION OF THE DRAWING

FIG. 1 is an end elevational view of a trailer situated on a sloping terrain and illustrating the claimed leveling system being employed to indicate in advance the number of standard blocks which will be necessary to level the trailer;

FIG. 2 is a perspective view of a leveling gauge used in the present invention; and FIG. 3 is a partial view, in perspective, of a trailer's or camper's wheel being supported by two standard blocks.

DESCRIPTION OF THE INVENTION

Referring now to the drawing, and more particularly to FIGS. 1 and 2, there is shown a view from the rear, of a house or camping trailer or camper 11, having a body 13 with a transverse surface 15 orthogonal to the longitudinal axis of the trailer, which in this view is perpendicular to the plane of the drawing. The body 13 is shown supported by a conventional spring suspension system including a pair of springs 17 attached to an axle 19 by U-bolts 21. The axle 19 is supported by a pair of tires 23 and 25 at each of its ends and since the tires are resting on a sloping ground surface 27 with the right tire 25 lower than the left tire 23, the transverse surface 15 of the trailer is also tilted at approximately the same angle. A horizontal reference line is shown by dashed line 29 to indicate the desired horizontal position or attitude of the transverse surface 15.

In order to determine in advance the number of standard blocks 31 of identical height dimension (see FIG. 3) which will be needed to be positioned under the tire 25 in order to level the transverse surface 15, a leveling gauge 33 is placed on the transverse surface 15 and elongated level sensing device 35 is positioned such that it is supported at its first end 37 by a graduated surface 39 of the gauge 33 and at its second end 41 by the transverse surface 15.

While the level sensing device 35 is of conventional design having a liquid filled elongated transparent spirit tube 43 containing a bubble 45, the gauge 33 is specially constructed so that successive positions along its graduated surface 39 indicate a successsive number of the standard blocks 31 which will be necessary to level the trailer or camper. For example, the graduated surface 39 may be in the form of steps, the first step 47 indicating that one standard block 31 is needed. The second step 49 indicates that two standard blocks 31 will be required; the third step 51 — three blocks; and the fourth step 53 indicating that four blocks will be needed, etc.

In operation, the trailer 11 is first moved to a desired location. The level sensing device 35 is then placed with its second end 41 resting on the trailer's transverse surface 15 (which may be the trailer's bumper, a special attachment to the trailer parallel to the trailer's floor, or the floor itself), while the first end 37 of the device is moved up and down until its bubble 45 is situated in the graduated tube 43 to indicate that the device is level (parallel to the horizontal reference line 29). The gauge 33 or the level sensing device 35 are moved relative to each other so that the first end 37 of the device rests on that particular step which supports the device 35 in a horizontal position. For example, the device 35 is shown resting on the second step 49, which indicates that two standard blocks 31 will be required to level the transverse surface 15 of the trailer.

The trailer is then moved slightly and the required number of blocks 31, as indicated by the graduated surface of the gauge, are placed on the ground surface 27 previously occupied by the lower tire 25. The trailer is then moved back to its original position, with the tire now resting on the blocks 31.

The height of each step on the graduated surface 39 of the leveling gauge 33 may be determined empirically or by appropriate calculations for a particular length of the level sensing device 35, the particular center-to-center tire span dimension 55, and a particular height dimension of the standard blocks 31.

The leveling gauge 33 may be fabricated from any solid material such as wood, or metal or plastic material. Also, the material used to fabricate the standard blocks 31 is not critical, and any material strong enough to support the tire load will be satisfactory. As illustrated in FIG. 3, leading edges 57 of the blocks 31 may be inclined in order to facilitate the moving of the tire 25 onto the blocks.

Particularly, it should be understood that the level sensing device 35 may be, for example, 10 to 12 inches in length, which is suitable for convenient handling and storage. Likewise, the gauge 33 should be proportioned for easy use and storage, and for a four step configuration for use with an average-sized trailer, the gauge could have a length dimension 59 of approximately 4 inches; a height dimension 61 of about 1 inch; and a width 63 of the order of 1½ inches.

What is claimed is:

1. A leveling system for leveling wheeled house and camping trailers and the like, the trailer having a normally horizontal transverse surface orthogonal to the longitudinal dimension of the trailer, the combination comprising:

an elongated level sensing and indicating device having a predetermined length and first and second ends;

a plurality of stackable standard blocks having identical height dimensions and adapted to support the lower disposed wheel of said trailer; and a level gauge having a lower planar surface positionable on said transverse surface and having a stepped graduated surface wherein each step denotes an additional standard block necessary to level said transverse surface, the height of each of said steps above said lower planar surface being related to said predetermined length of said device and to the center-to-center wheel span dimension of said trailer and to said height dimensions of said blocks, whereby the number of said blocks that will be necessary to stack below and support said lower disposed wheel in order to level said transverse surface is indicated by the particular one of said steps upon which said first end of said device rests when said second end is resting on said transverse surface and said device indicates a level condition.

2. A leveling system according to claim 1, wherein at least one side of each of said standard blocks has a sloping surface.

3. A leveling system according to claim 1, wherein said level sensing device includes a liquid filled transparent tube and an air bubble movable therein indicating when said device is level.

* * * * *